United States Patent [19]

Beardsley et al.

[11] Patent Number: 5,437,022
[45] Date of Patent: Jul. 25, 1995

[54] STORAGE CONTROLLER HAVING ADDITIONAL CACHE MEMORY AND A MEANS FOR RECOVERING FROM FAILURE AND RECONFIGURING A CONTROL UNIT THEREOF IN RESPONSE THERETO

[75] Inventors: Brent C. Beardsley; Susan K. Candelaria; Bradley S. Powers; Mark A. Reid, all of Tucson, Ariz.

[73] Assignee: International Business Machines Corporation, Armonk, N.Y.

[21] Appl. No.: 993,248

[22] Filed: Dec. 17, 1992

[51] Int. Cl.$^6$ .............................................. G06F 11/20
[52] U.S. Cl. .................... 395/575; 395/425; 371/10.1; 364/DIG. 1; 364/268.9; 364/269.2; 364/264
[58] Field of Search ............... 395/575, 425; 371/10.1, 371/10.2

[56] References Cited

U.S. PATENT DOCUMENTS

| | | | |
|---|---|---|---|
| 4,603,406 | 7/1986 | Miyazaki et al. | 371/10.1 |
| 4,916,605 | 4/1990 | Beardsley et al. | 395/425 |
| 5,119,488 | 6/1992 | Takamatsu et al. | 395/575 |
| 5,148,540 | 9/1992 | Beardsley et al. | 395/575 |
| 5,201,053 | 4/1993 | Benhase et al. | 395/725 |

Primary Examiner—Joseph L. Dixon
Assistant Examiner—Reginald Bragdon
Attorney, Agent, or Firm—Benman, Collins & Sawyer

[57] ABSTRACT

A storage controller having additional cache memory and a system for recovering from failure and reconfiguring a control unit thereof in response thereto. The inventive controller includes a first cluster for directing data from a host computer to a storage device and a second cluster for directing data from a host computer to a storage device. A first cache memory is connected to the first cluster and a second cache memory is connected to the second cluster. A first nonvolatile memory is connected to the second cluster and a second nonvolatile memory is connected to the first cluster. Data is directed to the first cache and backed up to the first nonvolatile memory. The second cache is similarly backed up by the second nonvolatile memory. In the event of failure of the first cache memory, data is directed to the second cache and backed up in the second nonvolatile memory.

3 Claims, 6 Drawing Sheets

STORAGE CONTROLLER HAVING ADDITIONAL CACHE MEMORY AND A MEANS FOR RECOVERING FROM FAILURE AND RECONFIGURING A CONTROL UNIT THEREOF IN RESPONSE THERETO

BACKGROUND OF THE INVENTION

1. Field of the Invention

The present invention relates to computing systems. More specifically, the present invention relates to systems for increasing the fault tolerance of computing systems.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

In large distributed computing systems, a plurality of host computers are typically connected to a number of direct access (permanent) storage devices (DASDs), such as a tape or disk drive unit, by a storage controller. Among other functions, the storage controller handles connection and disconnection between a particular computer and a DASD for transfer of a data record. In addition, the storage controller stores data in electronic memory for faster input and output operations.

The IBM Model 3990 storage controller, is an example of a storage controller which control connections between magnetic disk units and host computers. The host computers are typically main frame systems such as the IBM 3090, the Model ES9000, or other comparable systems.

The IBM 3990 Model 3 type controller can handle up to sixteen channels from host computers and up to sixty-four magnetic storage units. The host computers are connected to the storage controller by at least one and by up to four channels. The storage controller typically has two storage clusters, each of which provides for selective connection between a host computer and a direct access storage device and each cluster being on a separate power boundary. The first cluster might include a multipath storage director with first and second storage paths, a shared control array (SCA) and a cache memory. The second cluster typically includes a second multipath storage director with first and second storage paths, a shared control array and a non-volatile store (NVS).

Thus, each storage path in the storage controller has access to three addressable memory devices used for supporting storage controller operation: the cache; the non-volatile store; and the shared control array. The three memory devices and asynchronous work elements (AWEs) comprise the shared structures of the 3990 control unit.

Cache is best known for its application as an adjunct to computer memory where it is used as a high speed storage for frequently accessed instructions and data. The length of time since last use of a record is used as an indicator of frequency of use. Cache is distinguished from system memory in that its contents are aged from the point of time of last use. In a computer memory address space, program data has to be released before data competing for space in the address space gains access. In cache, competition for space results in data falling out of the cache when they become the least recently used data. While infrequently accessed data periodically enter cache, they will tend to "age" and fall out of cache. Modified data in cache is duplicated in nonvolatile memory. Storage controller cache performs an analogous function for direct access storage devices and storage controllers. Reading data from (and writing data to) the magnetic media of the direct access storage devices is fairly time consuming. Among the factors slowing the read and write operations are time required for the magnetic disk to bring a record location into alignment with a transducer and the limited bandwidth of the magnetic transducer used to read and write the data. By duplicating frequently accessed data in cache, read time for data is reduced and data storage system throughput is considerably enhanced.

Nonvolatile storage (NVS) serves as a backup to the cache for the buffering function. Access to NVS is faster than access to a direct access storage device, but generally slower than cache. Data are branched to cache and to NVS to back up the cache in case of power failure. Data written to NVS have been treated as being as safe as if written to magnetic media. Upon staging of a data record to NVS indication is given to the host computer that the data are successfully stored. The NVS is required for Fast Write operations and to establish Dual Copy pairs. If cache is made unavailable, all Fast Write data will be destaged during the make unavailable process and no new Fast Write data will be written to the NVS until cache is made available. When cache is unavailable, the NVS is still required to maintain the bit maps defining the cylinders that are out-of-sync between the primary and secondary devices for Dual Copy.

A shared control array (SCA) is a memory array which is shared over all storage paths. There are typically two types of data in the SCA. The first is data to support the DASD and the second is the data to support the caching and extended functions (i.e. Fast Write and Dual Copy).

Another resource available to the mainframe computer may be an asynchronous work element (AWE). An AWE is a task performed by any processor by which data is taken from the cache and written or "destaged" to DASD. These structures control the internal work elements which control the asynchronous function required by the caching control unit (i.e. Pack Change, destaged modified data, cache space management, etc.)

The conventional storage control unit is typically designed so that no single point of failure in the unit will cause a failure of the entire system. The failure of certain components, however, can cause a degradation in performance of the control unit. A failure in cache, for example, typically results in such a performance degradation. Unfortunately, host systems have become tuned and therefore so reliant on the speed afforded by a fully functional cache, that the performance degradation associated with a failure in cache has the same effect as a single point failure.

Thus, there is a need in the art for a system and technique for mitigating performance degradation in a storage control unit associated with a failure in cache memory associated therewith.

SUMMARY OF THE INVENTION

The need in the art is addressed by the storage controller of the present invention. The inventive controller includes a first cluster for directing data from a host computer to a storage device and a second cluster for directing data from the host computer to the storage device. A first cache memory is connected to the first cluster and a second cache memory is connected to the second cluster. A first nonvolatile memory is connected to the second cluster and a second nonvolatile memory is connected to the first cluster. Data is directed to the first cache and backed up to the first nonvolatile memory in a first operational mode. In the event of failure, data is recovered from the first nonvolatile memory. In a particular embodiment, in the event of failure of the first cache memory, data is directed to the second cache and backed up in the second nonvolatile memory in accordance with a second operational mode.

The invention provides additional cache memory and a system for recovering from failure and reconfiguring the control unit in response thereto. The invention thereby addresses the need in the art for a system and technique for mitigating performance degradation in a storage control unit associated with a failure in a cache memory thereof.

DESCRIPTION OF THE INVENTION

Illustrative embodiments and exemplary applications will now be described with reference to the accompanying drawings to disclose the advantageous teachings of the present invention.

Figure 1:
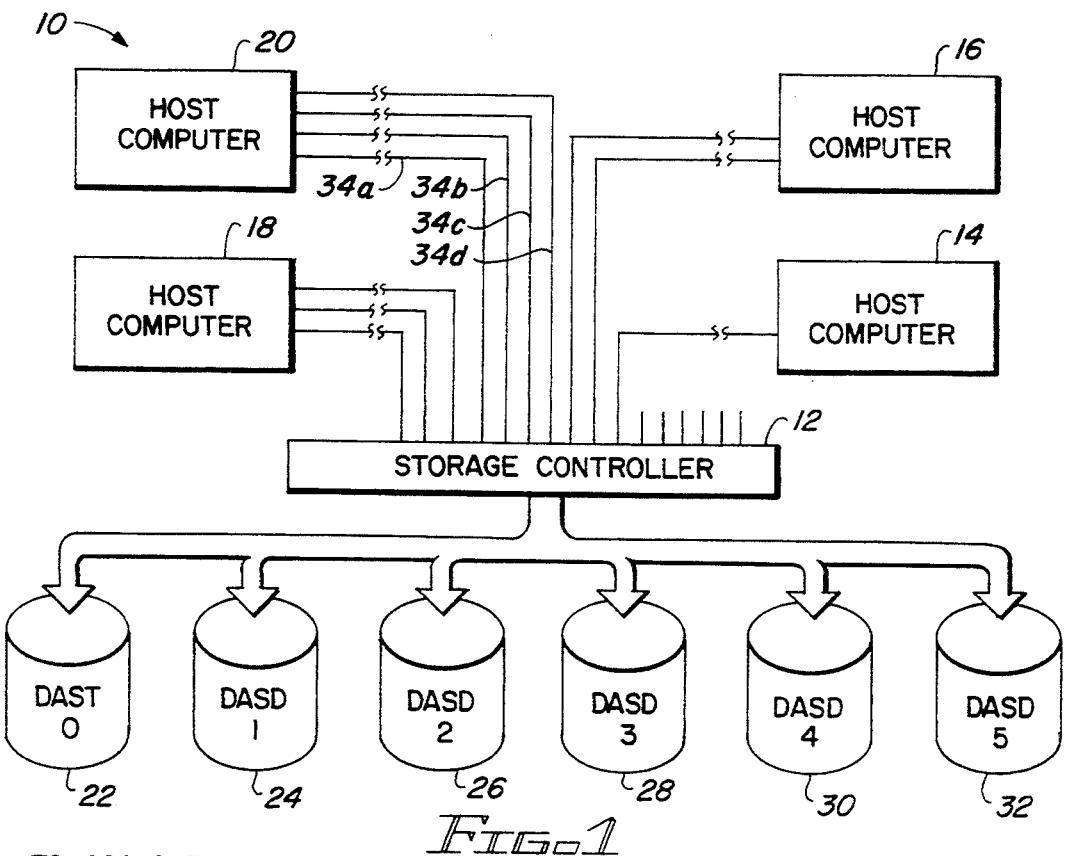
FIG. 1 is a high level block diagram of a data processing system.

FIG. 1 is a high level block diagram of a data processing system 10. The system 10 includes a storage controller 12, a plurality of host computers 14, 16, 18 and 20 and a plurality of direct access storage devices (DASD) 22-32. Presently, disk drive units are the most common type of DASD. In large multiple computer data processing systems, a large number of direct access storage devices serve several computers.

The storage controller 12 is logically positioned between the host computers 14-20 and the DASDs 22-32. The storage controller 12 handles connection and disconnection between a particular computer and magnetic disk unit for transfer of a data record.

The IBM Model 3990 storage controller, is an example of a storage controller used to control connections between magnetic disk units and host computers. The host computers 14-20 are typically main frame systems such as the IBM 3090, the Model ES9000, or other comparable systems.

The IBM 3990 Model 3 type controller can handle up to sixteen channels from host computers and up to sixty-four magnetic storage units. Hence, the host computers 14-20 are connected to storage controller 12 by at least one and by up to four channels. For example, the host computer 20 is connected to storage controller 12 by channels 34(a), 34(b), 34(c) and 34(d). Although four host computer systems and six direct storage devices are depicted in FIG. 1, the storage controller 12 can handle additional channels and direct access storage devices.

Figure 2:
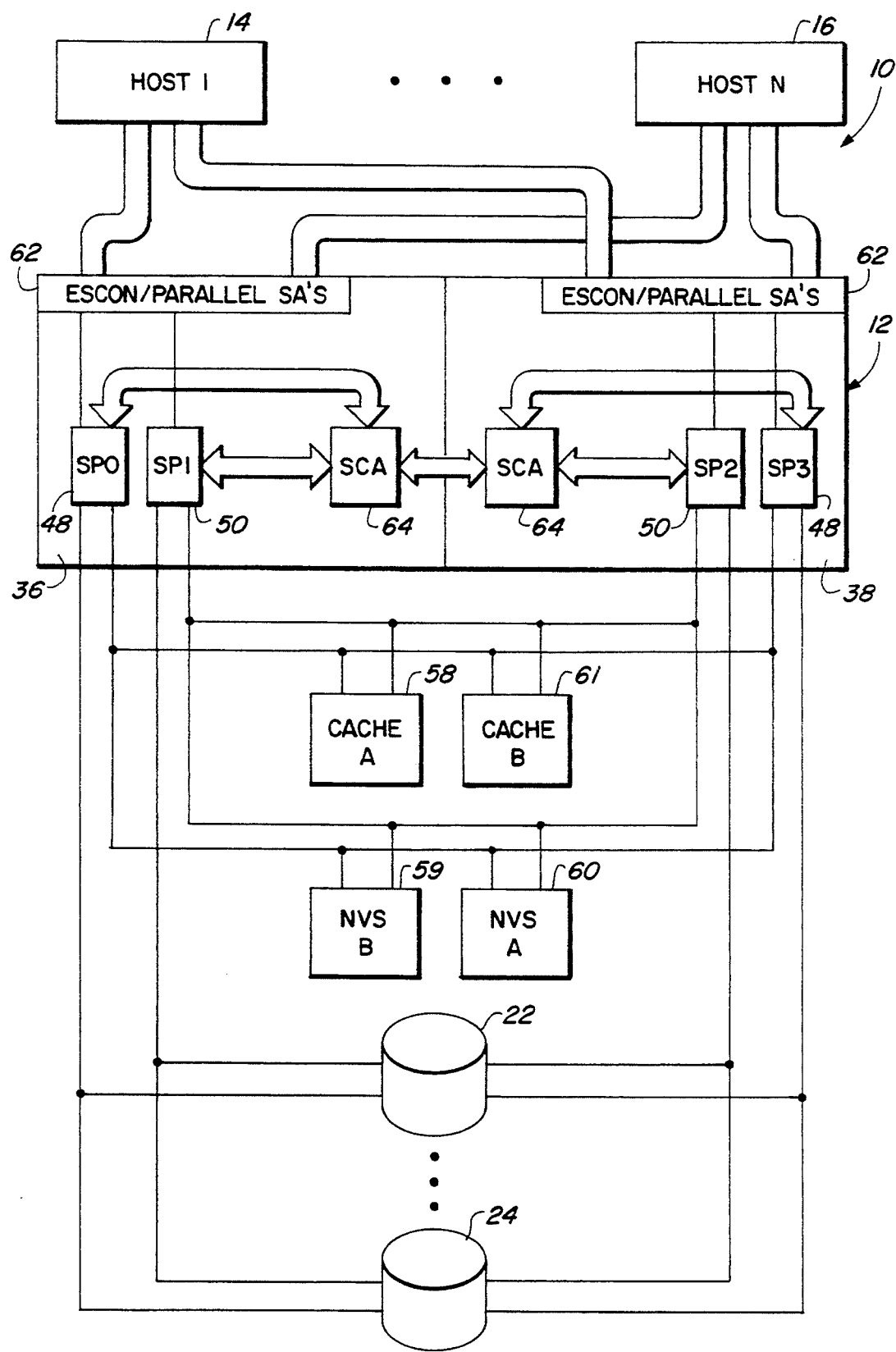
FIG. 2 depicts the storage controller of the data processing system of the present invention.

FIG. 2 depicts the storage controller 12 in greater detail. The storage controller 12 has two storage clusters 36 and 38, each of which provides for selective connection between a host computer and a direct access storage device. The clusters 36 and 38 are on separate power boundaries. Each cluster includes a first multipath storage director 62 with associated storage paths 48 and 50, and a shared control array (SCA) 64. The shared control arrays 64 of each cluster are interconnected as is known in the art. First and second cache memories (Cache A) 58 and (Cache B) 61 respectively, and first and second nonvolatile memories (NVS B) 59 and (NVS A) 60, respectively are provided. Each storage path of each cluster is connected to each cache memory and each nonvolatile memory for optimum reconfigurability as discussed herein. Data written to Cache A 58 is backed up in nonvolatile memory NVS A 60. Likewise, data written to Cache B 61 is backed up in nonvolatile memory NVS B 59.

Figure 3:
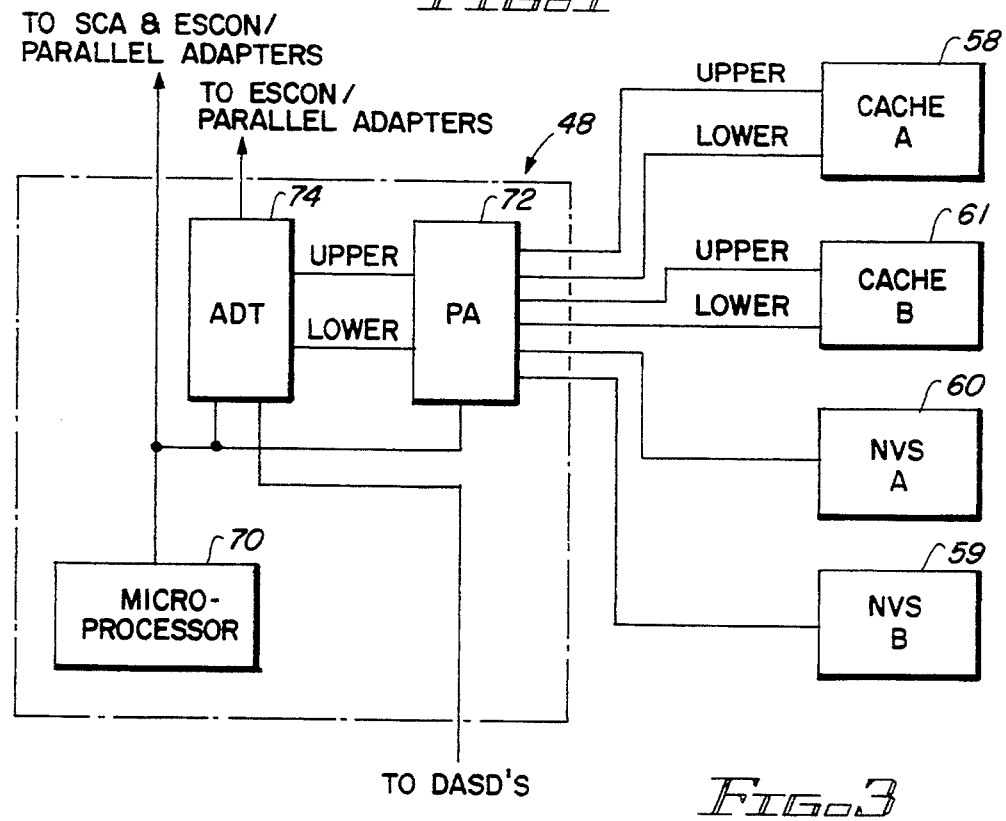
FIG. 3 is a block diagram of a storage path of the storage controller of the present invention.

FIG. 3 is a block diagram of a storage path. The storage path 48 is connected to a multipath storage director. Data transfer between the storage path 48 and one of the direct access storage devices occurs via a conventional automatic data transfer (ADT) circuit 74. A port adapter 72 controls transfer of data between the cache 58 and 61, the nonvolatile memories 59 and 60 and the ADT 74.

The cache and non-volatile memory provide for logical completion of certain data transfers without waiting for physical synchronization of disk and channel connection.

All operations of the storage path 48 are under control of a microprocessor 70. Processor control microcode is executed by the microprocessor in the storage path to control the operation of the storage controller. Hence, while each storage path is, in effect, a stand alone control unit based upon its own microprocessor, the storage paths share processor control information through the SCA 64 (not shown) for synchronization functions for handling connections, disconnection and reconnections relating to a transaction. Any scheme may be used to effect the conections and disconnections. U.S. Patent application entitled USE OF CONFIGURATION REGISTERS TO CONTROL ACCESS TO MULTIPLE CACHES AND NONVOLATILE STORES, Ser. No. 07/972,368, filed Dec. 17, 1992, by Beardsley, et al., the teachings of which are incorporated herein by reference, discloses a particularly advantageous technique for effecting the necessary connections and disconnections.

Figure 4:
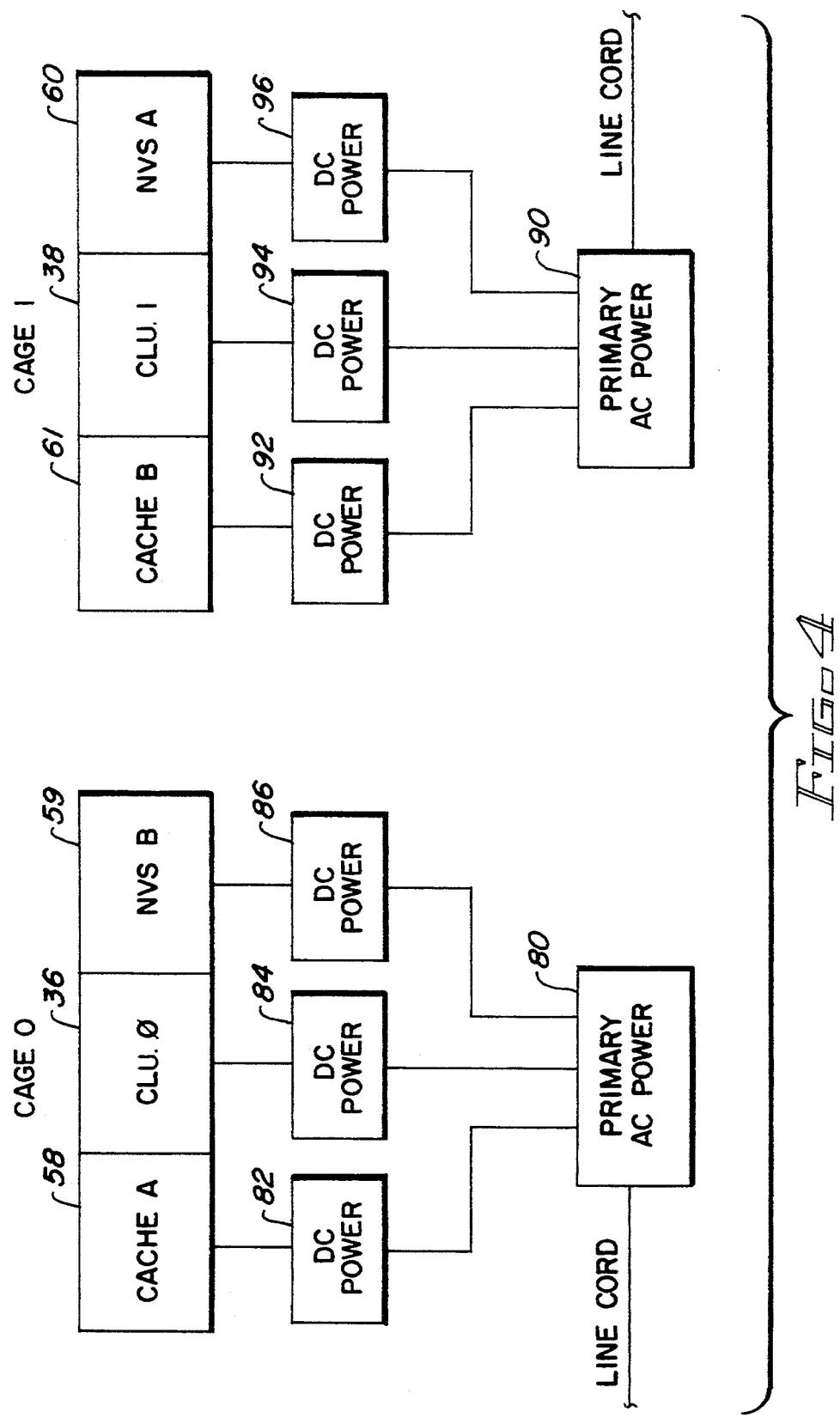
FIG. 4 is a block diagram illustrating the power management scheme of the storage controller of the present invention.

FIG. 4 is a block diagram illustrating the power management scheme of the present invention. In accordance with the present teachings, for each cluster, one of the cache memories and one of the nonvolatile memories are included within a separately powered cage. Thus, Cage 0 contains the first cluster 36, the first cache memory 58 and the first nonvolatile memory 59. Likewise, Cage 1 contains the second cluster 38, the second cache memory 61, and the second nonvolatile memory 60. Power is supplied to Cage 0 from wall power via a line cord and a conventional primary AC (alternating current) power supply 80. The primary AC power supply 80 supplies power to the first cache memory 58 via a first DC (direct current) power supply 82, to the first cluster 36 via a second DC power supply 84, and to the first nonvolatile store 59 through a third DC power supply 86.

The second cage (Cage 1) is powered via a second line cord and a second AC power supply 90. The second primary AC power supply 90 supplies power to the second cache memory 61 via a fourth DC power supply 92, to the second cluster 38 via a fifth DC power supply 94, and to the second nonvolatile memory 60 via a sixth DC power supply 96. Since the cache memories and the associated backup memories are on separate power boundaries, a failure in power supplied to a cache will not necessarily mean that power will not be supplied to the associated nonvolatile backup memory.

Thus, a particularly novel aspect of the invention is the provision of additional cache and nonvolatile backup memory therefor on separate power boundaries along with a flexible interconnection between the elements of the storage controller to allow for recovery and reconfiguration of the system in the event that one of the memory elements is rendered unavailable.

As illustrated in Tables 1 and 2 below, many recovery and reconfiguration modes are afforded by the novel and advantageous design of the present invention.

TABLE 1

Caching and EF states when components fail

| Definition of Symbols | | Cage 0 | | | Cage 1 | | |
|---|---|---|---|---|---|---|---|
| A | Available | B | C | N | B | C | N |
| S | Suspended, hardware is available but may not be fully utilized because of other failure(s) in the subsystem. | a s e | a c h e | V S | a s e | a c h e | V S |
| F | Fenced or unavailable (for base this means both SPs fenced) | | | | | | |
| * | Don't care, availability does not change state | | | | | | |
| ? | Variable, see description | 0 | A | B | 1 | B | A |
| Full EF Operation | | A | A | A | A | A | A |
| INVS B backs DFW data from Cache B, and NVS A backs DFW data from Cache A. | | | | | | | |
| Full EF Operation | | A | F | A | A | A | S |
| When failure is detected: | | | | | | | |
| 1. Emergency data in Cache A. | | | | | | | |
| 2. Once the destage is complete, full EF function is resumed. All caching functions use Cache B, NVS B still backs cache B. From this state: <br> - Loss of the other Cache would force an emergency destage from NVS and result in a total loss of cache operation. <br> - Loss of NVS A will cause no further Problems. NVS B will back all data in Cache B. <br> - Loss of NVS B would force an emergency destage from Cache, after recovery DFW would be inhibited. | | | | | | | |
| Full EF Operation | | A | A | F | A | A | A |
| When failure is detected: | | | | | | | |
| 1. Emergency destage from Cache B will be invoked to destage any data in NVS B. | | | | | | | |
| 2. Once destage is complete, full EF function is resumed. NVS A still backs Cache A. Cache B may not hold any DFW data. | | | | | | | |
| The reason for restricting DFW data from Cache B is that a linecord failure could cause a loss of availability to data. From this state: <br> - Loss of the other NVS would force an emergency destage from Cache A and result in a degraded read only cache operation. <br> - Loss of Cache B will cause no further problems except for data such as concurrent copy sidefiles that may have been lost. <br> - Loss of Cache A would force an emergency destage from NVS A, after recovery DFW would be inhibited. | | | | | | | |

TABLE 2

Caching and EF states when components fail

| Definition of Symbols | | Cage 0 | | | Cage 1 | | |
|---|---|---|---|---|---|---|---|
| A | Available | B | C | N | B | C | N |
| S | Suspended, hardware is available but may not be fully utilized because of other failure(s) in the subsystem. | a s e | a c h e | V S | a s e | a c h e | V S |
| F | Fenced or unavailable (for base this means that both SPs fenced) | | | | | | |
| * | Don't care, availability does not change state | | | | | | |
| ? | variable, see description | 0 | A | B | 1 | B | A |
| Full EF Operation | | A | A | F | A | F | A |
| From this state: <br> - Loss of NVS A would force an emergency destage from cache A and result in degraded read only cache operation. <br> - Loss of cache A would force an emergency destage from NVS A, | | | | | | | |

TABLE 2-continued

Caching and EF states when components fail

| Description | | | | | | |
|---|---|---|---|---|---|---|
| after recovery all caching functions will be Lost. | | | | | | |
| Caching but no DFW | A | F | F | A | A | S |
| The reason for restricting DFW is that a linecord failure to Cluster 1 could cause a loss of availability to data, that could otherwise be accessed via Base 0. To get into this state requires 2 independent failures. | | | | | | |
| Full EF Operation | F | F | F | A | A | A |
| When failure is detected: 1. Emergency destage from NVS A will be invoked to destage any data in NVS B. 2. Once destage is complete, full EF function is resumed with NVS A backing cache B. There is no additional availability concern here, a linecord failure that drops power to cache and NVS A will also drop power to Base 1. Availability to data is lost when the last Base fails whether or not cache and/or NVS is available. | | | | | | |
| Full EF operation | F | A | A | A | A | A |
| Once recovery from the lost SP(s) has occurred the remaining SP(s) will continue operation, both caches and NVSs are available. Failures on Cluster 1 when Cluster 0 is fully operational have the same states as when those components fail in Cluster 0 with Cluster 1 fully operational. | A | A | A | ? | ? | ? |
| Caching but no DFW | A | A | F | A | A | F |
| To get into this state requires 2 independent failures. | | | | | | |
| Base operation, no cache, no EF | A | F | * | A | F | * |
| Both caches are down. To get into this state requires 2 independent failures. | | | | | | |
| Storage Control is dead | F | * | * | F | * | * |
| As long as any of the SPs are operational there is availability to data. If both caches and NVSs are operational then EF will also be available. If all SPs are down there is no data availability. To get into this state requires 2 independent failures. | | | | | | |

Tables 1 and 2 illustrate caching and extended function states when components fail. (The term "extended function" or EF refers to DASD Fast Write (DFW), Cache Fast Write (CFW), Dual Copy, Concurrent, Copy and, in general, cache functions beyond basic read caching. A DASD fast write operation is one in which data to be written to the storage device is written to cache and backed up in nonvolatile memory (NVS). A cache fast write operation is one in which data to be written to the storage device is written to cache and not backed up in nonvolatile memory.) Tables 1 and 2 show an illustrative recovery and reconfiguration procedure for a failure scenario illustrated on the right side of the table.

For example, when Cache A58 fails, the configuration is changed to effect recovery and to maximize the operation of the system 10 using the remaining resources. Thus, in this case, NVS A60 is suspended and an emergency destage from NVS A60 is invoked to destage any data in Cache A58. (Destage refers to an operation by which data is written from electronic memory to DASD.) The configuration changes implemented on the failure of a component, in this case, Cache A58, are set forth in more detail below with reference to the flow diagrams of FIGS. 5-7. The reconfiguration and recovery scenarios are implemented in microcode run by the microprocessors 70 of the storage paths loaded during an initial microcode load (IML).

Returning to Table 1, once the destage is complete, full EF function is restored. All caching functions will now use Cache B61 and NVS B59 will still back up Cache B59. From this state: 1) loss of the other cache, Cache B61, would force an emergency destage from NVS B59 and result in a total Loss of cache operation; 2) loss of NVS A60 would cause no further problems; and 3) loss of NVS B59 would force an emergency destage from cache, after recovery DFW would be inhibited.

Figure 5:
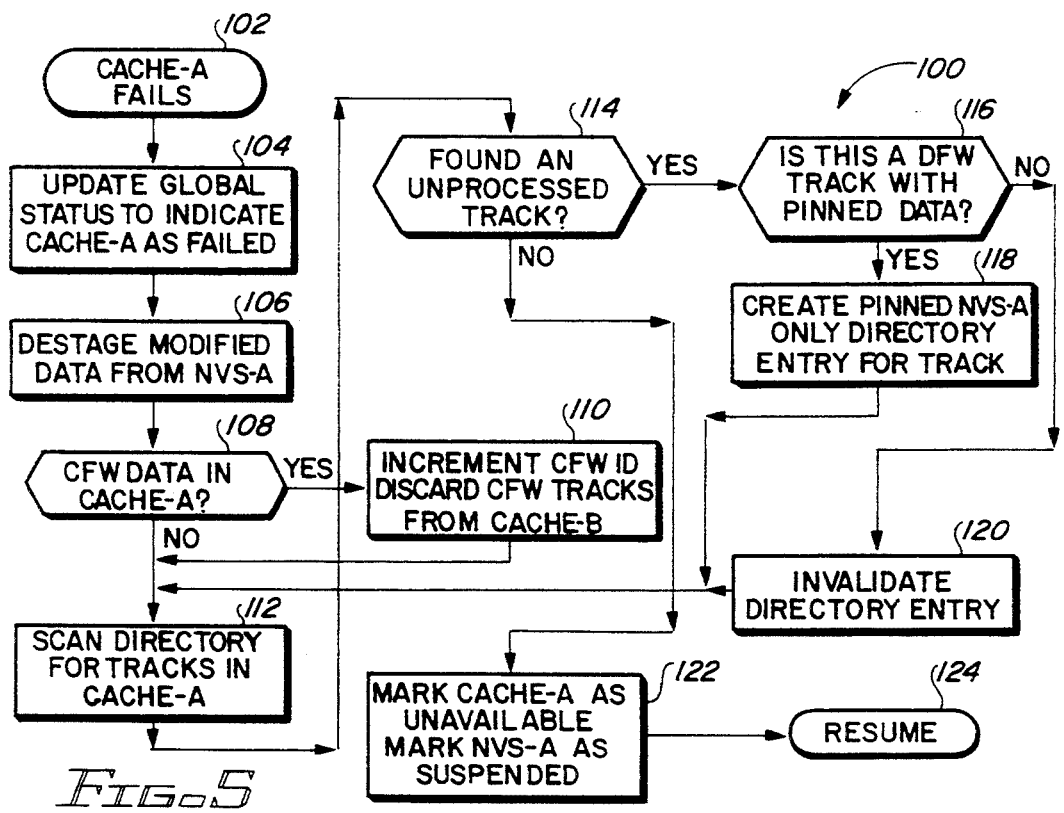
FIG. 5 is a flow diagram of an illustrative recovery and reconfiguration mode in the event of a failure of Cache A.
Figure 7B:
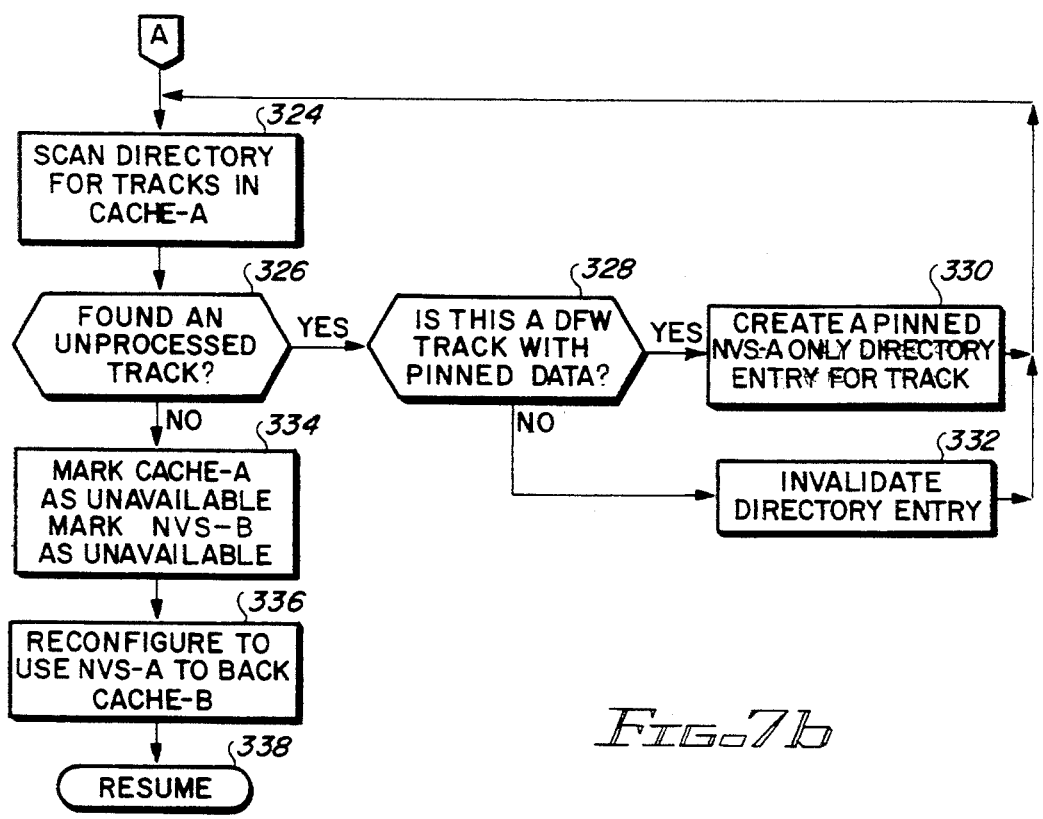
FIGS. 7(a) and 7(b) flow diagrams of an illustrative recovery and reconfiguration mode in the event of a failure of Cage 0 power.
Figure 6:
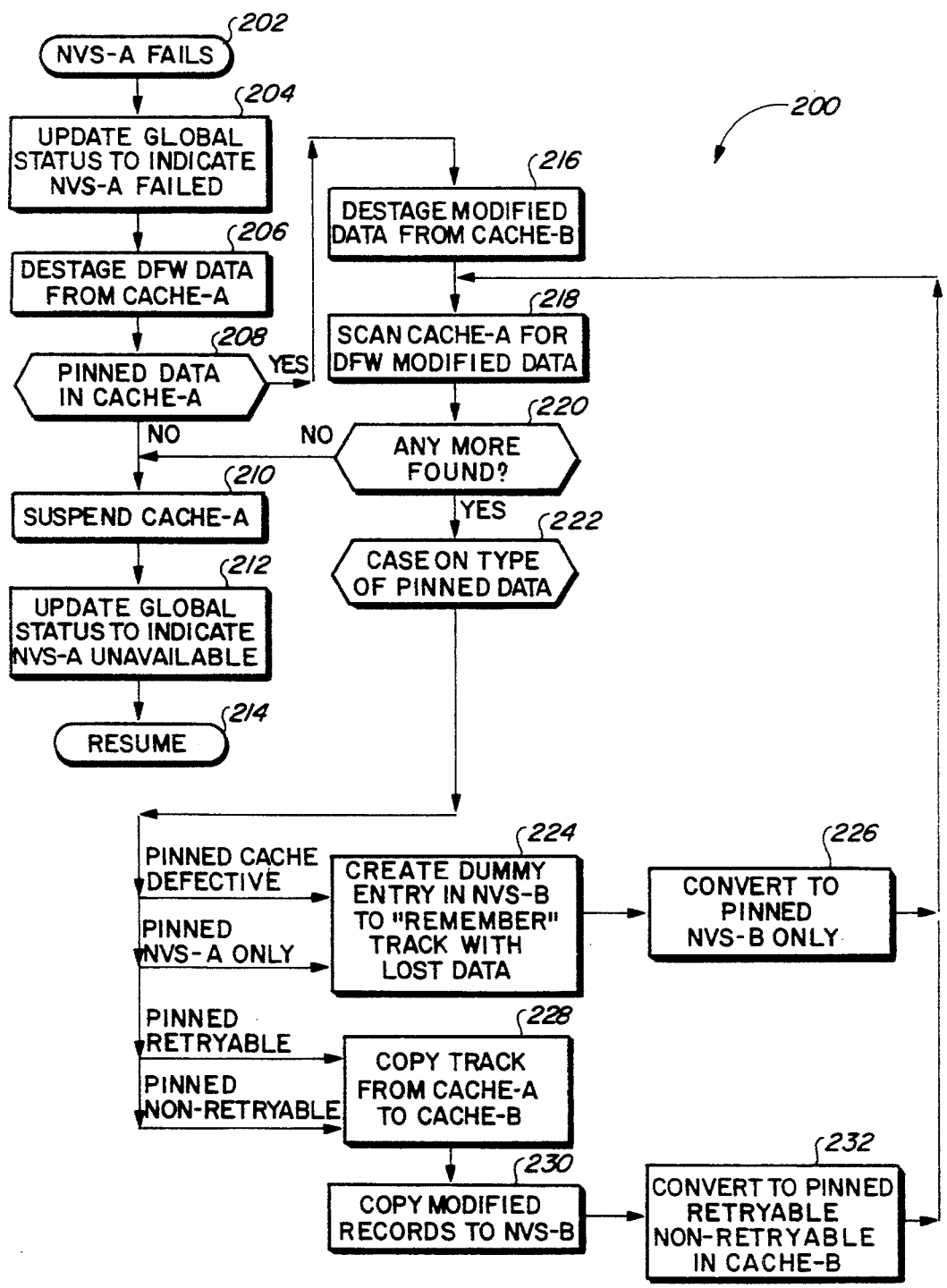
FIG. 6 is a flow diagram of an illustrative recovery and reconfiguration mode in the event of a failure of NVS A.
Figure 5:
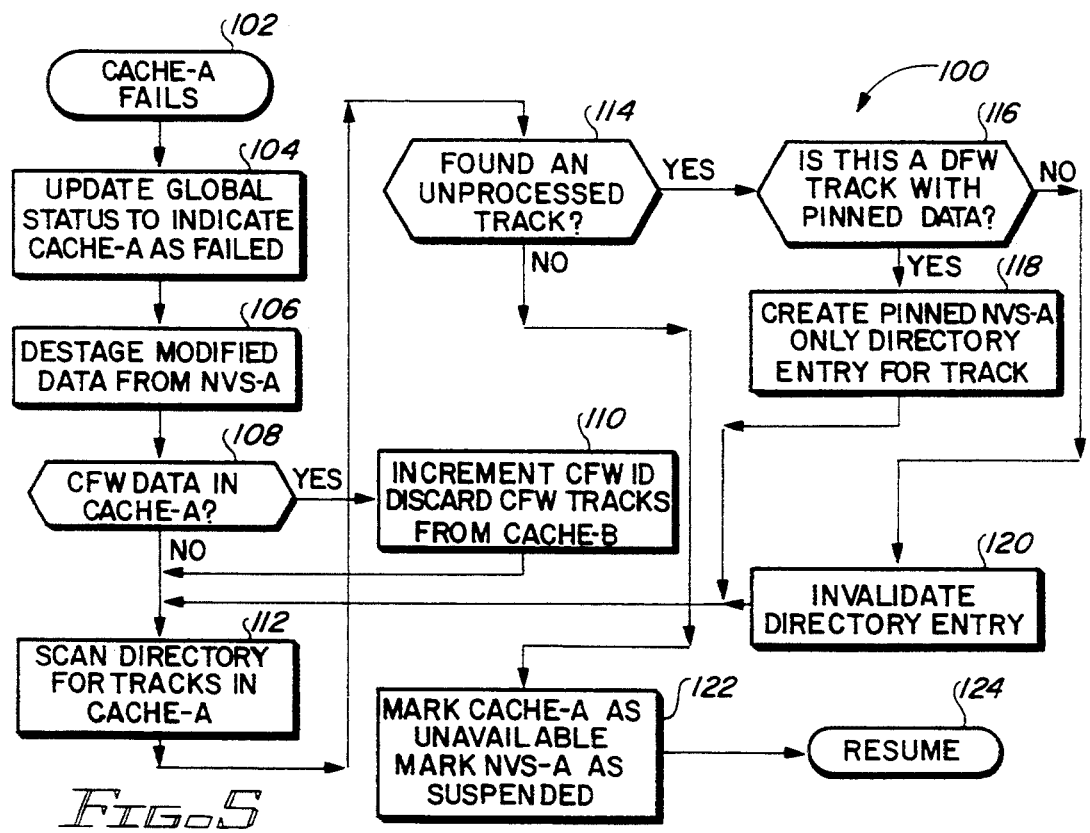
Figure 7B:
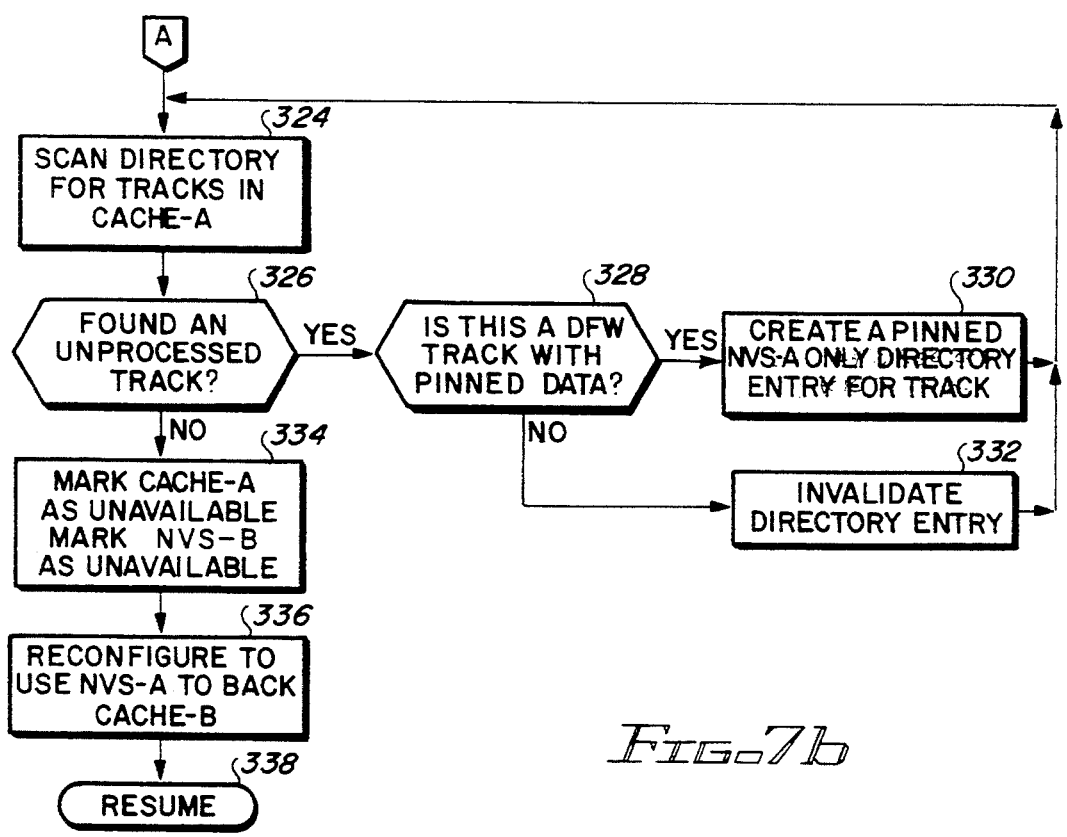

The flow diagrams of FIGS. 5, 6 and 7 are illustrative of the many recovery and reconfiguration modes that are afforded by the novel and advantageous design of the present invention.

FIG. 5 is a flow diagram of an illustrative recovery and reconfiguration mode in the event of a failure of cache memory, Cache A58. In this case, the subsystem (the storage controller and attached DASD) is taken offline and the following steps are performed before bringing the subsystem back online. At step 104 Cache A58 is set to failed in the Global Subsystem Status. Global Status and Updates are covered in U.S. Pat. No. 5,148,540, entitled SYSTEM WITH BACKUP OF DATA STORAGE STATUS AND DEVICE IDENTIFICATION FOR ENABLING SYSTEM RECOVERY AFTER POWER LOSS, issued Sep. 15, 1992 to Beardsley et al., the teachings of which are incorporated herein by reference.

Next, at step 106, an emergency destage from NVS A60 is effected. Records that are destaged successfully are freed. Records that are not destaged successfully are pinned in NVS A60 and the Cache A58 directory entry is marked 'Pinned NVS Copy Only'. (The directory is stored in SCA 64.)

Next, at step 108, a directory scan is initiated to determine if any CFW data exists in Cache A58. If so, step 110 is executed and the following operations are performed: 1) the CFW ID is incremented to indicate that all CFW data has been lost and 2) a scan of the directory is initiated for Cache B61 to invalidate directory entries that are CFW modified. CFW ID is an identification number used for Cache Fast Write data. The CFW ID is stored in Global Status and held in the SCA 64 for access by the microprocessor 70.

Next, at step 112, a scan is initiated for Cache A58 to invalidate directory entries that are unmodified, CFW modified, or DFW modified and are not pinned, and to convert some pinned directory entries.

Step 114 checks to determine if the scan is complete. If not, an unprocessed track has been found for Cache A58.

Step 116 determines if this is for a DFW pinned track. If so, then at step 118 the directory entry is corrected to an 'NVS Only Pinned Entry', otherwise, if at step 116 it is determined that the track does not contain pinned DFW data, then step 120 is executed to invalidate the directory entry in every case. The scan of the directory is resumed at step 112 after execution of either 118 or 120. Returning to step 114, if a directory entries for cache A58 have been processed, then execution continues with step 122.

Next, NVS A60 is suspended and used only for Dual Copy control information which is saved in both nonvolatile memories.

Next, Global Subsystem Status is updated to indicate that Cache A58 is unavailable.

Finally, the subsystem is reconfigured with the following states and normal execution is resumed at step 124.

TABLE 3

| Subsystem State After Cache A Fails | |
|---|---|
| Unit | State |
| Cache A | Unavailable |
| NVS A | Suspended |
| Cache B | Available |
| NVS B | Available |

FIG. 6 is a flow diagram of an illustrative recovery and reconfiguration mode in the event of a failure of nonvolatile memory, NVS A60. In this case, the system is taken offline and the following steps are performed before bringing the system back online.

At step 204, NVS A60 is set to "failed" in the Global Subsystem Status.

At step 206, Cache A58 is scanned to destage DFW modified directory entries. The modified tracks that are destaged successfully are marked not modified and are left in Cache A58. The modified tracks that are not destaged successfully are pinned.

At step 208 a check is made to determine if pinned data exists for Cache A58, then at step 216 a scan is initiated in Cache B61 to destage all modified tracks. The modified tracks that are destaged successfully are marked not modified and are left in Cache B61. The modified tracks that are not destaged successfully are pinned.

At step 218, a scan of the directory for Cache A58 is made for DFW pinned data entries. At step 220, a check is made for pinned DFW entries. If one is found, the type is determined at step 222.

If the type of pinned data was either Pinned Cache Defective (meaning that the data image in cache is defective, for example, it contains a word that is uncorrectable with an error correcting code) or Pinned NVS A60 only (meaning that data only resides in NVS A60 due to some previous condition); then execution proceeds to step 224 where an entry is made into NVS B59 to remember the identity of the track that had this data (from this point on, the modified data on this track is considered lost, the host must issue a 'discard pinned data' for this track before it can be accessed again); then step 226 is executed which converts the pinned entry to a 'pinned in NVS B59 only' entry; and execution returns to step 218.

If, instead, at step 222 it is determined that the track is 'pinned retryable' (i.e, nothing is wrong with the track image in cache, some other failure, perhaps a device problem has prevented the data from being destaged) or 'pinned non-retryable' (attempt to write the track to the device and found a track format problem) then execution proceeds to step 228 where the track is copied from Cache A58 to Cache B61, then to step 230 at which the modified fields of the track are copied into NVS B59 (so that the data has an on-line nonvolatile copy). At step 232, the entry is converted to reflect that it is a Cache/NVS B pinned track.

Referring back to steps 208 and 220, should it be found at step 208 that there is no pinned DFW data in Cache A58 or at step 220 that there are no more pinned DFW data in Cache A58, then execution proceeds to step 210.

Next, Cache A58 is suspended.

Since Cache A58 contains no DFW modified pinned entries, the Global Subsystem Status is updated to indicate that NVS A58 is unavailable. The subsystem is reconfigured with the following states.

TABLE 4

| Subsystem State After NVS A Fails | |
|---|---|
| Unit | State |
| Cache A | Suspended |
| NVS A | Unavailable |
| Cache B | Available |
| NVS B | Available |

Finally, an indicator is set in the SCA64 to indicate that Cache A58 is available but has no shadowing NVS.

FIG. 7 is a flow diagram of an illustrative recovery and reconfiguration mode in the event of a failure of Cage 0 power. A Cage 0 power loss causes both Cache A58 and NVS B59 to fail. In this case, the system is taken offline and the following steps are performed before bringing the system back online.

1. Set Cache A58 and NVS B59 to failed in the Global Subsystem Status.
2. Verify cache by invoking Cache Verify.
3. Scan Cache B to destage any modified tracks. Tracks that are destaged successfully are freed. Tracks that are not destaged successfully will be pinned.
4. Emergency destage records from NVS A60. Records that are destaged successfully are freed. Records that are not destaged successfully are pinned in NVS A60 and the Cache A58 directory entry is marked Pinned NVS Copy Only.
5. Attempt to transfer pinned DFW entries from Cache B61 to NVS A60. The pinned entries will be handled as follows.

Pinned Cache Defective—No action is required since DFW directory entries are never pinned defective.

Pinned NVS Copy Only—The Cache B61 directory entry is left in the SCA64 directory for the pinned NVS Copy Only track. A new record entry will be allocated in NVS A60 to describe each track that is Pinned NVS Copy Only in NVS B59.

Pinned Retryable—The pinned retryable records will be transferred from Cache B61 to NVS A60.

New NVS record allocations will be made in NVS A60 for DFW modified data. The modified records will be transferred to NVS A60.

Pinned Non-Retryable—The pinned non-retryable tracks will be transferred from Cache B61 to NVS A60. New NVS record allocations will be made in NVS A60 for the DFW modified data. The modified records will be transferred to NVS A60.

Next, a scan is initiated to determine if any CFW data exists in Cache A58. If so, then perform the following operations: 1) increment the CFW ID to indicate that all CFW data has been lost and 2) initiate a scan for Cache B61 to invalidate directory entries that are CFW modified.

Next, a scan is initiated for Cache A58 to invalidate directory entries that are unmodified, CFW modified, DFW modified and are not pinned, and to convert some pinned directory entries. The pinned directory entries for Cache A58 are handled as follows:

Pinned Cache Defective—Since all entries except Pinned NVS Copy Only will be invalidated, there will be no Pinned Cache (SS) defective entries.

Pinned NVS Copy Only—The Cache A58 directory entry is left in the SCA64 directory for the pinned NVS copy only track.

Pinned Retryable—The Cache A58 directory entry is converted to a Pinned NVS Copy Only track when the track contains DFW data.

Pinned Non-Retryable—The Cache A58 directory entry is converted to a Pinned NVS Copy Only Track when the track contains DFW data.

Finally, if the NVS procedure and the cache procedure are successful, then update the Global Subsystem Status to indicate that Cache A58 is unavailable and NVS B59 is unavailable. DFW data in Cache B61 will be backed by NVS A60 record entries. The subsystem is now reconfigured with the following states.

TABLE 5

| Subsystem State After Cache A and NVS B Fail | |
|---|---|
| Unit | State |
| Cache A | Unavailable |
| NVS A | Available |
| Cache B | Available |
| NVS B | Unavailable |

Additional illustrative configuration changes are set forth below without reference to an accompanying flow diagram.

Configuration Change Due to Recovery

Subsystem IML
1. Attempt to recover any failed NVSs.
2. Attempt to recover any available NVSs
3. If any DFW data was not recovered, then the DFW devices are put into 'FC'x state. ("FC" is a sense format 'F', message 'C', which means "indeterminant state", access to affected devices is prohibited.)
4. If either NVS was available, try to make both NVSs available.
5. If either cache was available, then attempt to bring both caches online.
6. Rebuild the configuration table to reflect the state of both caches and both NVSs.
7. Set segmentation addressing mode in the microprocessor registers.

Cache A Recover

The state of the subsystem is the Cache A58 unavailable, NVS A60 suspended, Cache B61 available, and NVS B59 available.
1. Run cache diagnostics to check out Cache A58.
2. If the diagnostics are successful, then perform the following steps:
   Build the free segment linked list. Add only those segments that are not in use by a directory entry that is pinned.
   Update Global Subsystem Status to indicated that Cache A58 is available.
   Resume NVS A60 that was suspended.
   Reconfigure the subsystem with all components available.
3. If the diagnostics are not successful then leave Cache A58 as unavailable.
4. Rebuild the configuration table to reflect the state of both caches and both NVSs.

NVS A Recovery

The state of the subsystem is the Cache A58 available, NVS A60 unavailable, Cache B61 available, and NVS B59 available.
1. Run NVS diagnostics to check out NVS A60.
2. If diagnostics are successful, then perform the following steps:
   Copy the Dual Copy control information from NVS B59 to NVS A60.
   Update Global Subsystem Status to indicate that NVS is available.
   Reset indicator(s) that Cache A58 has no shadowing NVS.
   Reconfigure the subsystem with all components available.
3. If the diagnostics are not successful, then leave NVS A60 as unavailable.
4. Rebuild the configuration table to reflect the state of both caches and both NVSs.

Cache A and NVS B Recovery (Cage 0 Power On)

The state of the subsystem is Cache A58 unavailable, NVS A60 available, Cache B61 available, and NVS B59 unavailable.
1. Suspend NVS A60. This inhibits DFW for the subsystem and destages all DFW data contained in NVS A60.
2. Bring NVS B59 online. This process includes:
   Copy the Dual Copy control information from NVS A60 to NVS B59.
   Copy pinned NVS Copy Only data from NVS A60 to NVS B59.
   Discard the pinned NVS Copy Only data from NVS A60.
3. Reconfigure the subsystem so that Cache B61 is available and NVS B59 is available. The state of the subsystem is now the following:

TABLE 6

| Subsystem State After NVS Vary Off, Vary Off Fails | |
|---|---|
| Unit | State |
| Cache A | Unavailable |
| NVS A | Suspended |
| Cache B | Available |
| NVS B | Available |

4. Perform recovery for Cache A58. See "Cache A Recovery"
5. Rebuild the configuration table to reflect the state of both caches and both NVSs.

Thus, the present invention has been described herein with reference to a particular embodiment for a particular application. Those having ordinary skill in the art and access to the present teachings will recognize additional modifications applications and embodiments within the scope thereof. For example, the invention is not limited to reconfiguration and recovery scenarios disclosed. Additional reconfiguration and recovery options are made possible by the additional cache and nonvolatile memory of the present invention and the associated flexible management scheme therefor.

It is therefore intended by the appended claims to cover any and all such applications, modifications and embodiments within the scope of the present invention.

Accordingly,

What is claimed is:

1. A storage controller comprising:
   first cluster means for directing data from a host computer to a storage device;
   second cluster means for directing data from a host computer to a storage device;
   a first cache memory connected to each of said cluster means;
   a second cache memory connected to each of said cluster means;
   a first nonvolatile memory connected to each of said cluster means;
   a second nonvolatile memory connected to each of said cluster means;
   wherein said first cluster means, said first cache memory and said second nonvolatile memory are connected within a first power boundary and said second cluster means, said second cache memory and said first nonvolatile memory are connected within a second power boundary, said second power boundary being separate from said first power boundary;
   first means for directing data to said first cache memory and backing up said data in said first nonvolatile memory and for directing data to said second cache and backing up said data in said second nonvolatile memory in a first operational mode; and
   second means for recovering data from said first nonvolatile memory in the event of a failure of said first cache memory said second means including means for directing data to said second cache and backing up said data in said first nonvolatile memory in a second operational mode.

2. The invention of claim 1 wherein said second means includes fourth means for recovering data from said second nonvolatile memory in the event of a failure of said second cache memory.

3. The invention of claim 2 wherein said fourth means includes means for directing data to said first cache and backing up said data in said second nonvolatile memory in a second operational mode.

* * * * *

UNITED STATES PATENT AND TRADEMARK OFFICE
CERTIFICATE OF CORRECTION

PATENT NO. : 5,437,022

DATED : Jul. 25, 1995

Figure 7A:
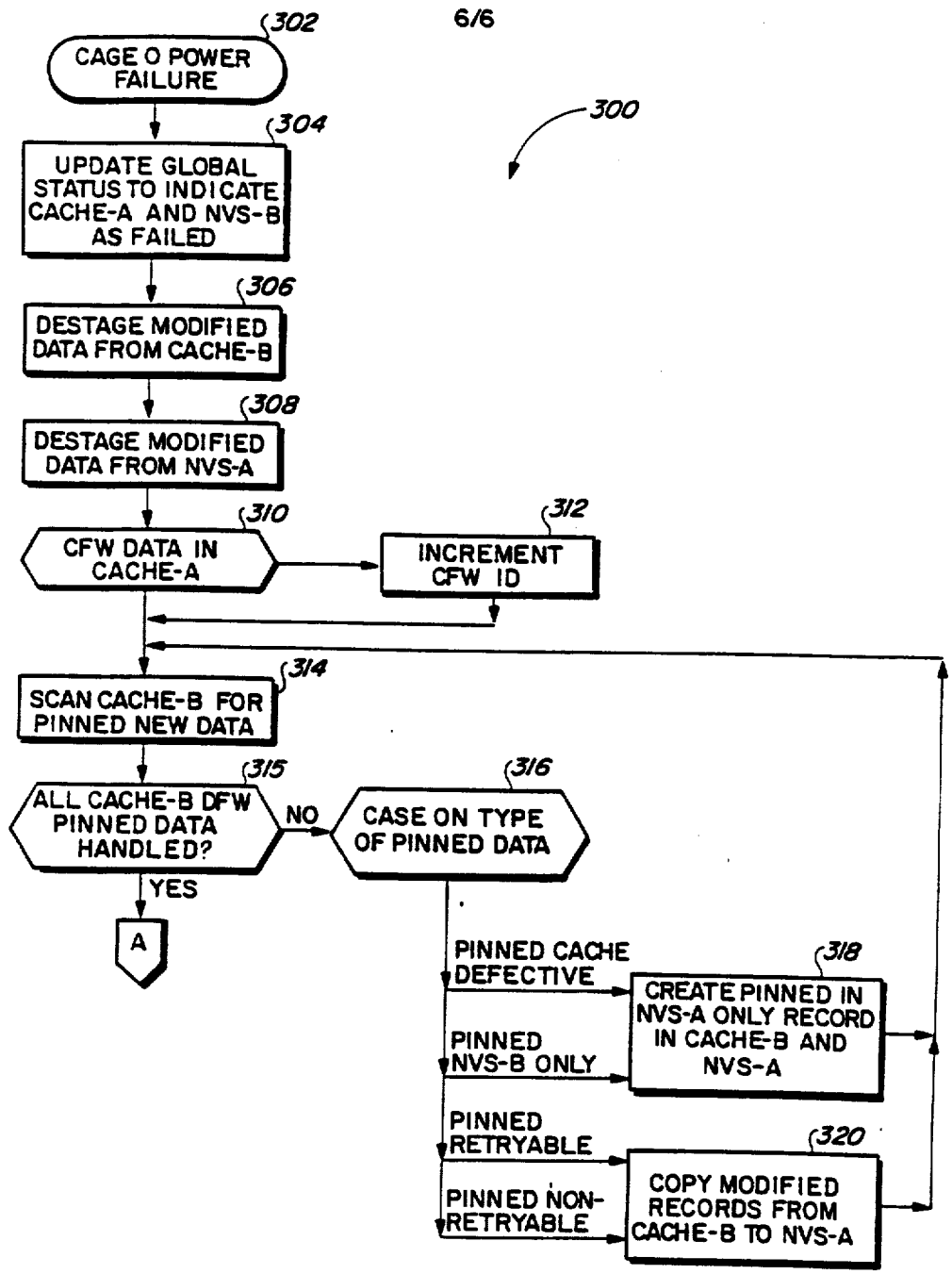

INVENTOR(S) : Brent C. Beardsley; Susan K. Candelaria, Bradley S. Powers and Mark A. Reid It is certified that error appears in the above-indentified patent and that said Letters Patent is hereby corrected as shown below:

In drawings, delete sheet 6 of 6 and replace it with FIG. 7a as sheet 6 of 6.

At column 3, line 44, "flow diagrams" should be -- are flow diagrams--.

At column 4, line 60, "Ser. No. 07/972,368" should be -- Ser. No. 07/992,368 --.

In Table 1, in the first line after "Full EF Operation", "INVS" should be -- NVS --.

In Table 1, "1. Emergency" (first occurance) should be -- Emergency destage from NVS A will be invoked to destage any --.

At column 9, line 15, delete "a".

Signed and Sealed this

Twenty-eighth Day of November 1995

Attest:

BRUCE LEHMAN

Attesting Officer

Commissioner of Patents and Trademarks